3,493,396
3-METHYLTHIOPROPYLAMINE AND ITS NON-TOXIC SALTS AS A FLAVORING AGENT
Kiyoshi Nakayama, Sagami-hara-shi, Hiroshi Hagino, Hachi-oji-shi, and Akio Shiga, Machida-shi, Japan, assignors to Kyowa Hakko Kogyo Kabushiki Kaisha, Tokyo, Japan
No Drawing. Filed Dec. 1, 1966, Ser. No. 598,189
Claims priority, application Japan, Dec. 14, 1965, 40/74,253
Int. Cl. A23l 1/26
U.S. Cl. 99—140             7 Claims

ABSTRACT OF THE DISCLOSURE

The present invention is concerned with the seasoning of foodstuffs by the use of 3-methylthiopropylamine and/or its derivatives, alone or in combination with other flavoring agents.

---

Summary of the invention

It is well-known to use such compounds as sodium glutamate, sodium inosinate, sodium guanylate, and sodium succinate for seasoning or enhancing the taste of foodstuffs. Furthermore, various compositions containing amino acids which can be obtained by hydrolysing animal or plant proteins with acids or enzymes, or compositions containing substances related to the nucleic acids and obtained by decomposition of nucleic acids, have been used for the same purpose. Each of such compounds or compositions may be used alone, but they are sometimes used together as mixtures of two or more such compounds or compositions whereby especially good enhancement of flavor may result.

The present invention is based upon the discovery that the taste or flavor of foodstuffs can be substantially improved or enhanced by the addition of 3-methylthiopropylamine ($CH_3SCH_2CH_2CH_2NH_2$) or its derivatives, such as its salts and acyl-derivatives.

According to the present invention, therefore, we provide a foodstuff which contains 3-methylthiopropylamine (3MTPA) as flavoring agent. 3MTPA can if desired be added as a derivative thereof, e.g., a salt formed with an acid, for example, hydrochloric acid, sulphuric acid, succinic acid, gultamic acid, or inosinic acid.

Examples of foodstuffs which can be improved by the addition of 3MTPA include soup, sauce, paste, sausage, canned food, salad, boiled or cooked food, pickles, alcoholic drink, vinegar, bread, fruit juice and fermented foodstuff.

3MTPA can be advantageously produced by the process utilizing a microorganism disclosed in Japanese Patent application No. 40/69,760 filed Nov. 15, 1965, and its United States counterpart pending application Ser. No. 593,697, filed Nov. 14, 1966, which are both incorporated by reference.

3MTPA is stable to heat, to various compositions commonly included in foodstuffs, and to chemical seasoning agents to which 3MTPA can be added. Therefore 3MTPA can in general be added during or after cooking to any foodstuff to improve its flavor or taste. In other words, it can be added to finished or pre-cooked foods or raw foodstuffs. However, 3MTPA in the free form is preferably added only to pre-cooked foods or to foods not requiring cooking, owing to its volatility.

3MTPA can if desired be used together with other seasoning or enhancing agents; thus 3MTPA can be advantageously added to other conventional seasoning or flavor enhancing agents, e.g., table salt (sodium chloride), glutamic acid (preferably as the sodium salt) or protein hydrolysates, or alternatively 3MTPA can be combined for example with glutamic acid as its glutamic acid salt.

According to a further feature of the invention, therefore, we provide a composition for flavoring or seasoning foodstuffs, which comprises 3MTPA in admixture with another seasoning or flavoring agent, e.g., table salt (sodium chloride), protein hydrolysates, sodium glutamate, glutamic acid, inosinic acid, a sweetening agent, or a flavoring agent of bitter taste. 3-methylthiopropylamine hydrogen glutamate is believed to be a new chemical compound, per se, having utility as a flavoring agent.

When 3MTPA is used by itself, it is preferred to use acid salts such as its hydrochloride even though acid salts of 3MTPA have a weaker odor or almost no odor in comparison with that of free 4MTPA. While free 3MTPA is liable to volatilize and has a somewhat unique odor, a suitable form for addition of 3MTPA should be selected according to its use or purpose.

The amount of 3MTPA to be added may vary with various factors depending for example upon the nature and amount of the foodstuffs, and upon the presence of other seasoning agents, if any, such as sodium glutamate, inosinic acid, sweetening agents, bitters, or salts.

The threshold values for detection of the odor of 3MTPA in the free form and as the hydrochloride are respectively about 0.0001% (in aqueous solution) and 0.0125% (by weight). The lower limits of 3MTPA according to the present invention in the free form and as the hydrochloride are preferably about 0.00002% and 0.0002% respectively; the preferred upper limits are about 0.2% and 2% respectively. The most satisfactory amount should of course be determined according to the desired taste and flavor.

The following results obtained from various experiments show outstanding features of the present invention.

(a) *Material*.—To an ordinary commercial beer there was added 0.005% of 3MTPA (as the hydrochloride).

(b) *Test method and results*.—A taste-test panel consisting of 20 men and 20 women was given two kinds of the test materials, respectively with or without 3MTPA. The following table shows that there exists a significant difference between the two kinds of beer and that the beer containing 3MTPA is far stronger tasting than that without 3MTPA.

| Testers | Number of testers preferring the sample containing 3MTPA (Risk=0.1% or 99.9% probability of meaningful result) | Numbers of testers preferring the control |
|---|---|---|
| Men, 20 | 17 | 3 |
| Women, 20 | 18 | 2 |
| Total, 40 | 35 | 5 |

The following non limitative examples illustrate the invention.

Example 1

To 500 g. of a white sauce (commercial grade) there were added 5 mg. of 3MTPA (free amine form), and the sauce was well stirred to yield a homogeneous mixture. The white sauce obtained was observed to be remarkably improved and had double flavor and taste and good body.

Example 2

150 g. of potatoes, 100 g. of onions and 50 g. of carrots were cut into small cubes, which were boiled with 500 ml. of water to prepare a conventional vegetable soup. The soup was then diluted with hot water to one litre and 7 g. of table salt were added. To this soup was added 0.5 g. of 3MTPA (as the hydrochloride) with stirring. The resulting soup had stronger flavor and better taste than similar soup containing no 3MTPA, and was observed to be excellent for e.g. Chinese noodles.

Example 3

The enhancing ability of glutamic acid (sodium salt) was substantially improved. 0.05 g. of 3MTPA (as the hydrochloride) was added to 100 g. of sodium glutamate, and the mixture was ground and mixed until homogeneous. The mixture was tested functionally and was found to be far superior to the sodium glutamate alone with regard to the flavor and taste of food treated therewith.

Example 4

7 g. of table salt were added to one litre of a conventional soup (prepared from a soup stock of commercial grade), and 0.5 g. of 3MTPA (as the hydrochloride) and 0.5 g. of sodium glutamate were added to improve the flavor and taste.

Example 5

0.05 g. of 3MTPA (as the glutamic acid salt) was added to one litre of a soy-sauce prepared and heat-sterilized in a conventional manner to improve considerably the flavor and taste.

What is claimed is:
1. A foodstuff comprising a foodstuff and as a flavoring agent a member of the group consisting of 3-methylthiopropylamine in an amount of 0.00002% to 0.2% by weight based on foodstuff, and its non-toxic salts in an amount of 0.0002% to 2.0% by weight based of foodstuff.

2. The composition of claim 1 containing at least 0.0001 weight percent flavoring agent.
3. The composition of claim 1 wherein said flavoring agent is a non-toxic acid salt of 3-methylthiopropylamine.
4. The composition of claim 1 wherein said flavoring agent is the hydrochloride of 3-methylthiopropylamine.
5. The composition of claim 1 wherein said flavoring agent is in the form of its glutamate salt.
6. The composition of claim 1 in combination with another flavoring agent selected from the group consisting of sodium glutamate, sodium inosinate, sodium chloride, sodium guanylate, sodium succinate, glutamic acid, protein hydrolysate and nucleotide.
7. The composition of claim 3 wherein said 3-methylthiopropylamine is in the form of its acid addition salt formed by reacting said 3-methylthiopropylamine with a member of the group consisting of hydrochloric acid, glutamic acid, sulfuric acid, succinic acid or inosinic acid.

References Cited

UNITED STATES PATENTS 3,326,697   6/1967   Shimazono et al. _____ 99—140

OTHER REFERENCES

Chemical Abstracts, vol. 4, 1910, pp. 3064–3065.
Patton: J. of Dairy Science, vol. 37, 1954, pp. 446–452.

MAURICE W. GREENSTEIN, Primary Examiner

H. H. KLARE III, Assistant Examiner

U.S. Cl. X.R.

99—31, 91, 105, 109, 124, 144, 145, 147